United States Patent
Azuma et al.

(10) Patent No.: US 11,845,621 B2
(45) Date of Patent: Dec. 19, 2023

(54) ROBOT AND ROBOT SYSTEM HAVING THE SAME

(71) Applicant: Kawasaki Jukogyo Kabushiki Kaisha, Kobe (JP)

(72) Inventors: Kentaro Azuma, Kobe (JP); Takayuki Ishizaki, Kakogawa (JP); Mitsunobu Oka, Kobe (JP); Masataka Yoshida, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 441 days.

(21) Appl. No.: 17/182,235

(22) Filed: Feb. 23, 2021

(65) Prior Publication Data

US 2021/0171295 A1 Jun. 10, 2021

Related U.S. Application Data

(63) Continuation of application No. PCT/JP2019/032331, filed on Aug. 19, 2019.

(30) Foreign Application Priority Data

Aug. 23, 2018 (JP) ................. 2018-156233

(51) Int. Cl.
| | |
|---|---|
| *B65G 61/00* | (2006.01) |
| *B25J 5/00* | (2006.01) |
| *B25J 9/06* | (2006.01) |
| *B25J 9/16* | (2006.01) |
| *B65G 41/00* | (2006.01) |

(Continued)

(52) U.S. Cl.
CPC ............... *B65G 61/00* (2013.01); *B25J 5/00* (2013.01); *B25J 9/06* (2013.01); *B25J 9/1689* (2013.01); *B65G 41/005* (2013.01); *B65G 47/915* (2013.01); *B25J 15/0616* (2013.01)

(58) Field of Classification Search
None
See application file for complete search history.

(56) References Cited

U.S. PATENT DOCUMENTS 4,611,749 A * 9/1986 Kawano ............... B25J 15/0052
228/176
4,620,353 A * 11/1986 Pryor .................... B22D 46/00
164/4.1

(Continued)

FOREIGN PATENT DOCUMENTS

| CN | 105531207 A | 4/2016 |
|---|---|---|
| DE | 10 2018 111 371 A1 | 11/2018 |

(Continued)

*Primary Examiner* — Kavel Singh
(74) *Attorney, Agent, or Firm* — XSENSUS LLP

(57) ABSTRACT

A robot is provided, which includes a base, a first robot fixed to the base at a base end thereof, and a second robot fixed to the base at a base end thereof. The first robot has a first robotic arm and a first robot hand attached to a tip end of the first robotic arm. The second robot has a second robotic arm and a second robot hand attached to a tip end of the second robotic arm. The first robot hand includes a conveyor, and the second robot hand includes a holding part configured to hold a workpiece. The second robot places the workpiece held by the holding part on a transferring surface of the conveyor of the first robot and releases the workpiece.

20 Claims, 8 Drawing Sheets

(51) Int. Cl.
*B65G 47/91* (2006.01)
*B25J 15/06* (2006.01)

(56) References Cited

U.S. PATENT DOCUMENTS

| | | | |
|---|---|---|---|
| 4,758,828 A * | 7/1988 | Mitsumori | G09G 3/30 |
| | | | 345/76 |
| 4,785,528 A * | 11/1988 | Soderberg | B25J 19/0012 |
| | | | 414/744.8 |
| 9,352,463 B2 * | 5/2016 | Tomo | B25J 15/0616 |
| 10,351,362 B2 | 7/2019 | Tanaka et al. | |
| 2014/0079524 A1 * | 3/2014 | Shimono | G05B 19/41815 |
| | | | 414/801 |
| 2015/0063972 A1 | 3/2015 | Girtman et al. | |
| 2017/0107058 A1 | 4/2017 | Nakamoto et al. | |
| 2018/0111765 A1 | 4/2018 | Wicks et al. | |
| 2018/0333849 A1 | 11/2018 | Sugio | |

FOREIGN PATENT DOCUMENTS

| | | |
|---|---|---|
| JP | 61-282226 A | 12/1986 |
| JP | 2016-55995 A | 4/2016 |
| JP | 2016-94280 A | 5/2016 |
| JP | 2018-39534 A | 3/2018 |
| WO | 2006/134709 A1 | 12/2006 |

* cited by examiner

ROBOT AND ROBOT SYSTEM HAVING THE SAME

CROSS-REFERENCE TO RELATED APPLICATIONS

The present application claims priority to PCT/JP2019/032331, filed Aug. 19, 2019, which claims priority to JP 2018-156233, filed Aug. 23, 2018, the entire contents of each are incorporated herein by reference.

TECHNICAL FIELD

The present disclosure relates to a robot and a robot system having the robot.

BACKGROUND ART

Conventionally, robots having a movable conveyor and a holding mechanism, which holds a workpiece and places the workpiece on a transferring surface of the conveyor, are known. One example of such robots is a load handling device disclosed in Patent Document 1.

The load handling device disclosed in Patent Document 1 is provided with a movable conveyor and a take-out arm. The movable conveyor advances so as to approach a load, and a gripping part provided at a tip end of the take-out arm grips the load. After the take-out arm places the load on the movable conveyor, it changes its posture to a load-avoiding posture. Then, the movable conveyor descends to the height of a conveying bench, and a belt constituting a transferring surface of the conveyor rotates so as to place the load onto the conveying bench.

REFERENCE DOCUMENT OF CONVENTIONAL ART

[Patent Document]
[Patent Document 1] JP2016-055995A

SUMMARY

A robot according to one aspect of the present disclosure includes a base, a first robot fixed to the base at a base end thereof, and a second robot fixed to the base at a base end thereof. The first robot has a first robotic arm and a first robot hand attached to a tip end of the first robotic arm. The second robot has a second robotic arm and a second robot hand attached to a tip end of the second robotic arm. The first robot hand includes a conveyor, and the second robot hand includes a holding part configured to hold a workpiece. The second robot places the workpiece held by the holding part on a transferring surface of the conveyor of the first robot and releases the workpiece.

According to this structure, the conveyor is attached to the tip end of the first robotic arm, and thus, the conveyor can be moved within a range where the tip end of the first robotic arm is movable. Moreover, the second robot can place the workpiece held by the holding part on the transferring surface of the conveyor of the first robot and release the workpiece. As a result, a robot that is capable of transferring the workpiece by the movable conveyor, without limiting the installing location, can be provided.

The base may have a base body and a movable part provided to the base body. The first robot may be fixed to the base body at the base end thereof. The second robot may be fixed to the movable part at the base end thereof so as to be movable at least in one of a longitudinal direction connecting the base end of the first robot and the base end of the second robot and a width direction perpendicular to the longitudinal direction.

According to this structure, the second robot is movable at least in one of the width direction and the longitudinal direction by the movable part provided to the base body. Therefore, even when the workpiece to be transferred is located outside the movable range of the tip end of the second robotic arm, the posture of the second robotic arm can be easily changed so that the holding part can hold the workpiece. As a result, the effects achieved by the present disclosure can be remarkable.

The movable part may have a pivot shaft extending from the base body, and a movable-part body attached to the pivot shaft so as to be pivotable centering on the pivot shaft in a plane in which the longitudinal direction intersects with the width direction. The second robot may be fixed to the movable-part body at the base end thereof so as to be movable at least in one of the longitudinal direction and the width direction.

According to this structure, the second robot can be moved at least in one of the width direction and the longitudinal direction by the movable part having a simple configuration.

The base may have an automated guided vehicle.

According to this structure, since the robot can be easily moved, the effects achieved by the present disclosure can be remarkable.

The holding part may be a suction part configured to suck and hold the workpiece.

According to this structure, for example, even when holding one workpiece from workpieces piled up without gaps therebetween, a side part etc. of the one workpiece can be sucked so that the one workpiece is easily held without interference of the other workpieces.

For example, the conveyor may be a belt conveyor.

At least one of the first robot and the second robot may be a vertically articulated robot.

According to this structure, at least one of the first robot and the second robot can easily take a desired posture. As a result, the effects achieved by the present disclosure can be remarkable.

The first robotic arm may have four or more joint axes.

According to this structure, the first robotic arm can easily take a desired posture. As a result, the effects achieved by the present disclosure can be remarkable.

The second robotic arm may have six or more joint axes.

According to this structure, the second robotic arm can easily take a desired posture. As a result, the effects achieved by the present disclosure can be remarkable.

A robot system according to one aspect of the present disclosure includes any one of the above described robots.

According to this structure, by being provided with the robot, the conveyor can be moved within the range where the tip end of the first robotic arm is movable. Moreover, the second robot can place the workpiece held by the holding part on the transferring surface of the conveyor of the first robot and release the workpiece. As a result, the robot system capable of transferring the workpiece by the movable conveyor while the installing location will not be limited, can be provided.

The robot system may further include a user interface configured to remotely operate the robot.

According to this structure, the robot can be remotely operated by using the user interface. As a result, the robot system capable of transferring the workpiece by the movable conveyor while the installing location will further be unlimited, can be provided.

The robot system may further include an imaging device configured to image a working state of the robot, and an output device configured to output the imaged information of the imaging device.

According to this structure, the operator can input a command value to the user interface while accurately grasping the working state of the robot based on the information outputted from the output device.

BRIEF DESCRIPTION OF DRAWINGS

FIG. 3A is an overall side view, and FIG. 3B is an end view of a first robot hand when seen from the front.

FIG. 4A is an overall side view, and FIG. 4B is a perspective view of a second robot hand when seen from the inside.

FIG. 5A is a view when one of piled cardboard boxes is held, and FIG. 5B is a view when the cardboard box is released on a transferring surface of a conveyor.

FIG. 6A is a view when a posture of the first robot is changed so that the transferring surface of the conveyor continues to a transferring surface of a stationary-type conveyor, and FIG. 6B is a view when the transferring of the cardboard box to the stationary-type conveyor is finished.

DESCRIPTION OF EMBODIMENTS

Figure 1:
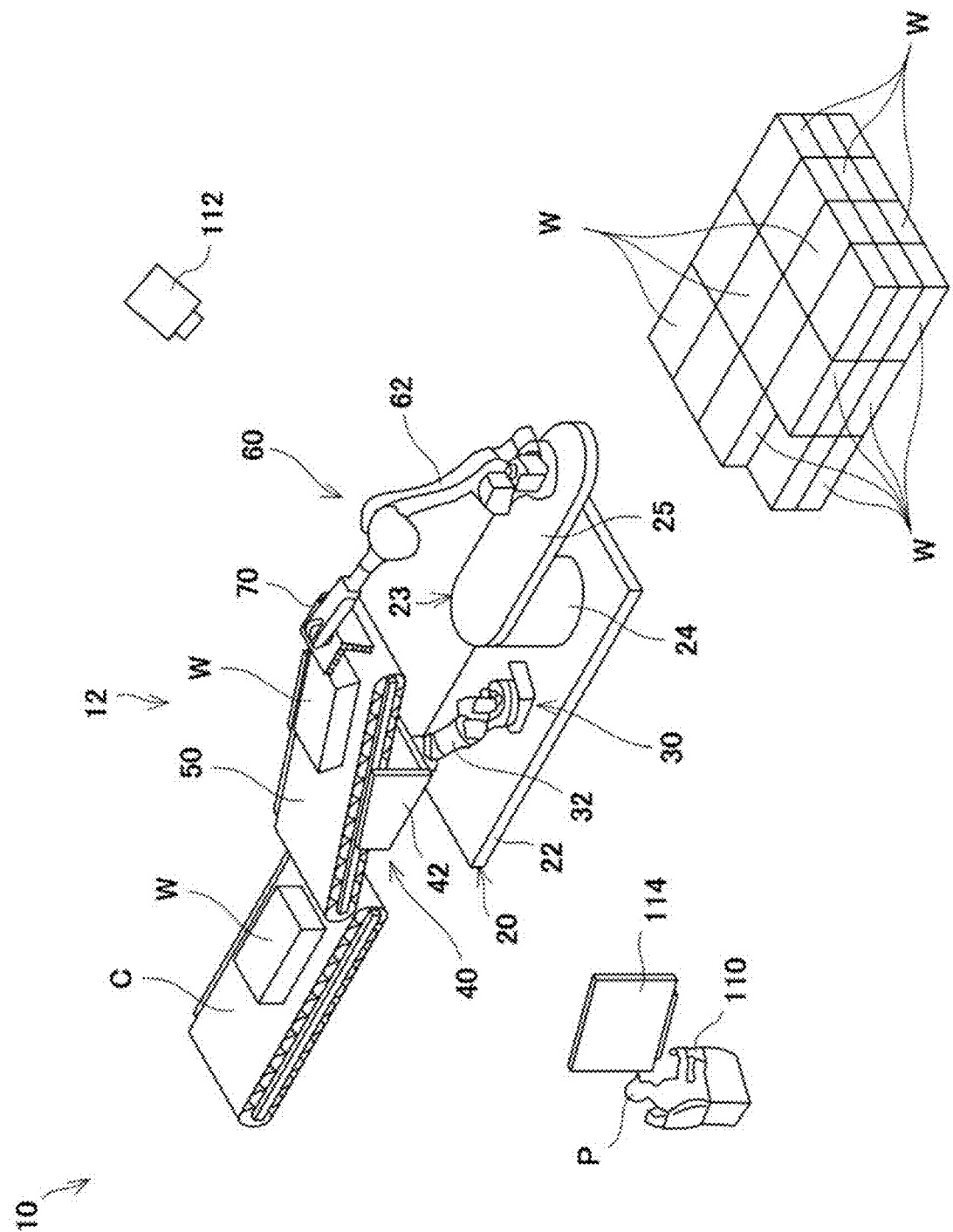
FIG. 1 is a schematic view illustrating a state in which a robot system according to an exemplary embodiment of the present disclosure is used to transfer a cardboard box.

Hereinafter, a robot and a robot system having the robot according to an exemplary embodiment of the present disclosure are described with reference to the accompanying drawings. Note that the present disclosure is not limited to this embodiment. Moreover, below, the same reference characters are given to the same or corresponding components throughout the drawings to omit redundant description.

(Robot System 10)

Figure 2:
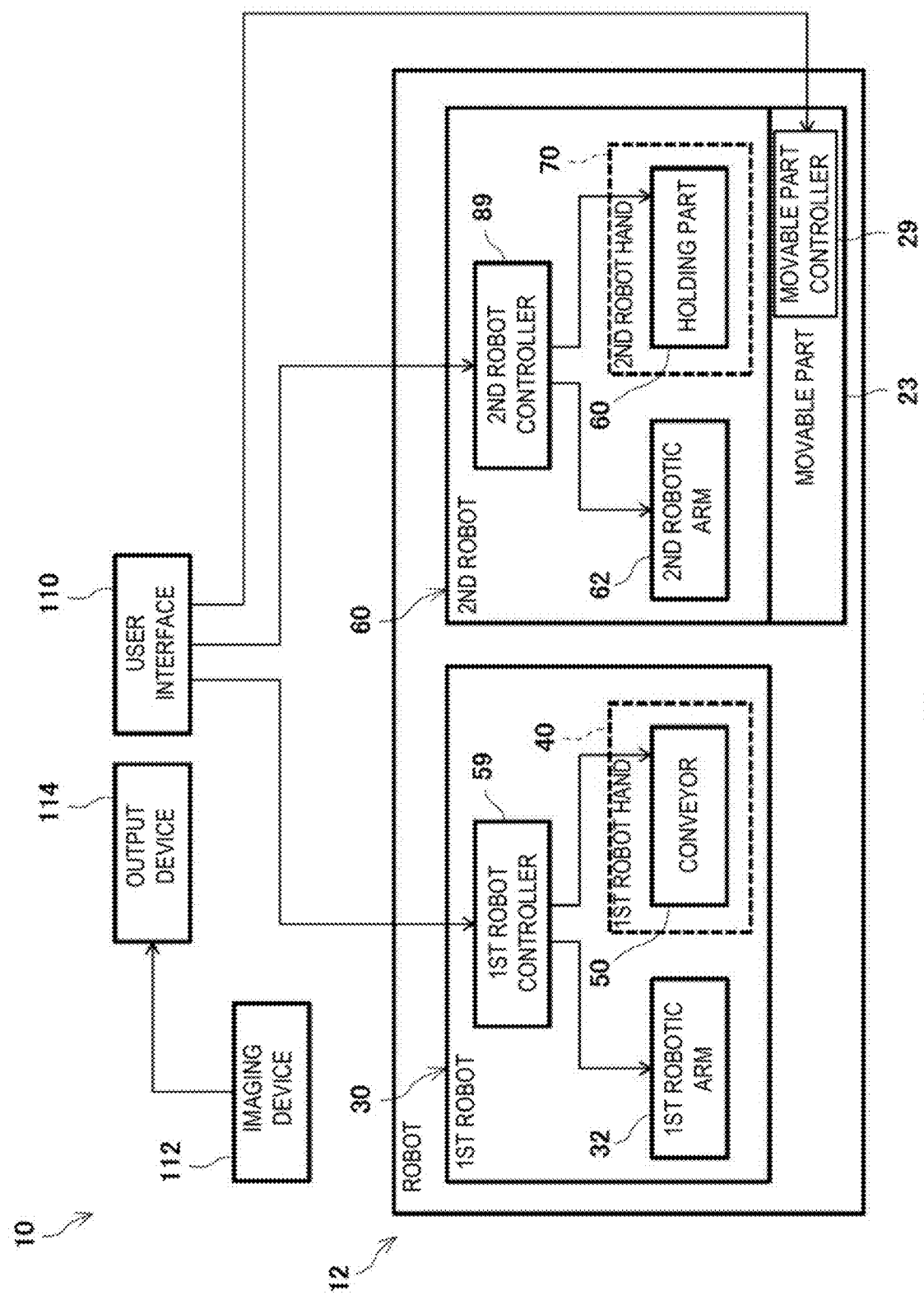
FIG. 2 is a block diagram illustrating the entire configuration of the robot system according to an exemplary embodiment of the present disclosure.

FIG. 1 is a schematic view illustrating a state in which a robot system according to an exemplary embodiment is used to transfer a cardboard box. FIG. 2 is a block diagram illustrating the entire configuration of the robot system. As illustrated in FIG. 1, a robot system 10 according to this embodiment transfers a cardboard box W (a workpiece) which is sealed while packing an object therein. In detail, the robot system 10 transfers cardboard boxes W piled on a truck bed L (see FIGS. 5 to 7) one by one to a stationary-type conveyor C, which is disposed separately from the truck bed L. Note that illustration of the truck bed L is omitted in FIG. 1 in order to avoid the drawing being complicated.

As illustrated in FIG. 1, the robot system 10 according to this embodiment is provided with a robot 12 and a user interface 110 which remotely operates the robot 12. Moreover, the robot system 10 is further provided with an imaging device 112 which images a working state of the robot 12 and an output device 114 which outputs the information captured by the imaging device 112.

(Robot 12)

As illustrated in FIG. 1, the robot 12 includes a base 20, a first robot 30 fixed to the base 20 at its base end, and a second robot 60 similarly fixed to the base 20 at its base end.

(Base 20)

The base 20 has a base body 22 formed in a plate-like shape, and a movable part 23 provided to the base body 22. The base body 22 has a rectangular shape when seen in a thickness direction, and is placed on a bottom plate of the truck bed L (described later). The movable part 23 has a pivot shaft 24 extending from the base body 22, and a movable-part body 25 which is pivotable by being attached to the pivot shaft 24 centering on the pivot shaft 24 in a plane where a longitudinal direction of the robot 12 intersects with and a width direction.

The movable part 23 also has a movable-part controller 29 which controls the operation of the movable part 23 itself according to, for example, the operational information from the user interface 110, based on a program stored in advance in a storage device. A concrete configuration of the movable-part controller 29 is not particularly limited, and it may be implemented, for example, by a known processor (e.g., a CPU) operating based on the program stored in the storage device (e.g., a memory).

Note that in the following description a direction connecting a base end of the first robot 30 and a base end of the second robot 60 is referred to as a "longitudinal direction of the robot 12," a direction corresponding to the thickness direction of the base body 22 and perpendicular to the longitudinal direction is referred to as a "height direction of the robot 12," and a direction corresponding to a width direction of the base body 22 and perpendicular to the longitudinal direction and the height direction is referred to as a "width direction of the robot 12."

Note that in this embodiment the second robot 60 is movable by the movable part 23 as described later. Therefore, to be accurate, the longitudinal direction of the robot 12 is a direction connecting the base end of the first robot 30 and the base end of the second robot 60, in an initial state where a longitudinal direction of the movable-part body 25 corresponds to a longitudinal direction of the base body 22. In other words, the longitudinal direction of the robot 12 is a direction connecting the base end of the first robot 30 and a base end of the pivot shaft 24 of the movable part 23.

(First Robot 30)

Figure 3A:
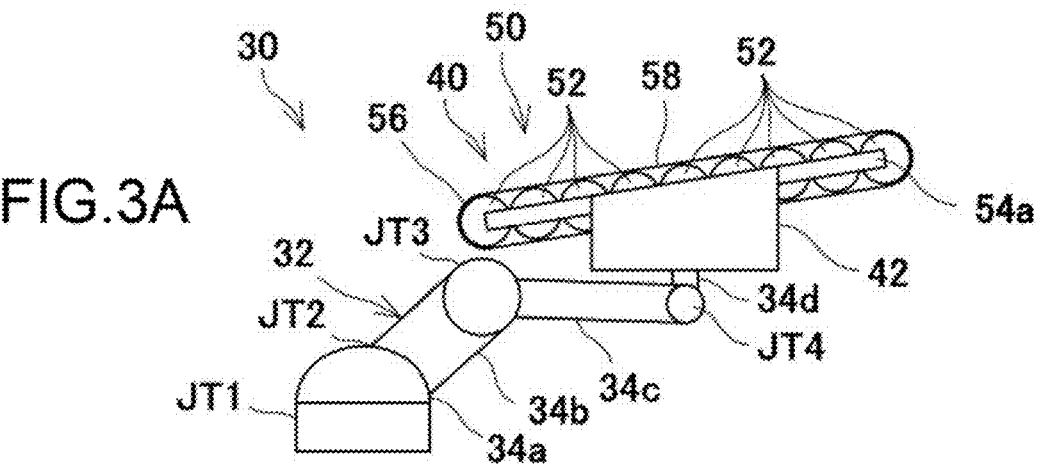
FIGS. 3A and 3B are views illustrating a first robot of the robot system according to an exemplary embodiment of the present disclosure, where
Figure 3B:
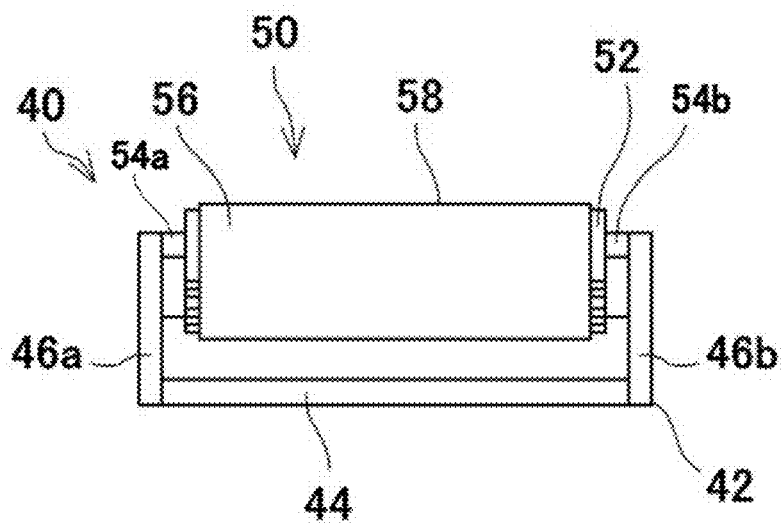

FIGS. 3A and 3B are views illustrating the first robot of the robot system according to this exemplary embodiment.

FIG. 3A is an overall side view, and FIG. 3B is an end view of a first robot hand when seen from the front. As illustrated in FIG. 3A, the first robot 30 is provided with a first robotic arm 32 and a first robot hand 40 attached to a tip end of the first robotic arm 32. Moreover, as illustrated in FIG. 2, the first robot 30 is further provided with a first robot controller 59 which controls operations of the first robotic arm 32 and the first robot hand 40. The first robot 30 is a vertically articulated robot.

(First Robotic Arm 32)

As illustrated in FIG. 3A, the first robotic arm 32 is an articulated arm having four joint axes (shafts) JT1-JT4, and four links 34a-34d serially coupled to each other via the corresponding joint axes.

The first joint axis JT1 couples an upper surface of the base body 22 to a base-end part of the first link 34a so as to be rotatable about a vertical axis. The second joint axis JT2 couples a tip-end part of the first link 34a to a base-end part of the second link 34b so as to be rotatable about a horizontal axis. The third joint axis JT3 couples a tip-end part of the second link 34b to a base-end part of the third link 34c so as to be rotatable about a horizontal axis.

Moreover, the fourth joint axis JT4 couples a tip-end part of the third link 34c to a base-end part of the fourth link 34d about an axis extending perpendicularly to a longitudinal direction of the third link 34c. Then, the first robot hand 40 is attached to a tip-end part of the fourth link 34d.

(First Robot Hand 40)

As illustrated in FIGS. 3A and 3B, the first robot hand 40 has a base part 42 attached to a tip end of the first robotic arm 32, and a conveyor 50 fixed to the base part 42.

The base part 42 has a bottom plate 44 in a rectangular shape when seen in its thickness direction, a side plate 46a standing from one end edge of the bottom plate 44 in its width direction, and a side plate 46b standing from the other end edge of the bottom plate 44. The side plates 46a and 46b have the same shape. Each of the side plates 46a and 46b has a trapezoidal shape when seen in its thickness direction.

As illustrated in FIG. 3A, each of the side plates 46a and 46b has, when seen in its thickness direction, one base and the other base extending in the height direction, a first leg, and a second leg. The first leg connects one end of the one base in the height direction (a lower end in FIG. 3A) to one end of the other base in the height direction (a lower end in FIG. 3A). The second leg connects the other end of the one base in the height direction (an upper end in FIG. 3A) to the other end of the other base in the height direction (an upper end in FIG. 3A). In FIG. 3A, the first leg extends horizontally, and the second leg extends to incline downwardly toward downstream in the transferring direction of the conveyor 50.

The conveyor 50 is a belt conveyor. The conveyor 50 has a known configuration, which includes rollers 52 disposed in parallel to each other in the transferring direction, a pair of shafts 54a and 54b which support rotational shafts of the rollers 62, a ring-shaped transferring belt 56 wound around the rollers 52, and an electric motor which rotary drives at least one of the rollers 52.

The shaft 54 is attached, at its intermediate part in the longitudinal direction, to the side plate 46a of the base part 42 along an upper end edge of an inner surface of the side surface 46a of the base part 42. Moreover, the shaft 54 is attached, at its intermediate part in the longitudinal direction, to the side plate 46b of the base part 42 along an upper end edge of an inner surface of the side surface 46 of the base part 42.

Therefore, in FIG. 3A, the pair of shafts 54 incline downwardly toward downstream in the transferring direction of the conveyor 50, by the same inclining angles of the second legs of the side plates 46a and 46b of the base part 42.

Accordingly, the entire conveyor 50 inclines downwardly toward downstream in the transferring direction, by the same inclining angles of the second legs of the side plates 46a and 46b of the base part 42. That is, a transferring surface 58 of the conveyor 50 similarly inclines.

(First Robot Controller 59)

As illustrated in FIG. 2, the first robot controller 59 controls the operations of the first robotic arm 32 and the conveyor 50 according to, for example, the operational information from the user interface 110 based on a program stored in advance in a storage device. A concrete configuration of the first robot controller 59 is not particularly limited, and it may be implemented, for example, by a known processor (e.g., a CPU) operating based on the program stored in the storage device (e.g., a memory).

(Second Robot 60)

Figure 4A:
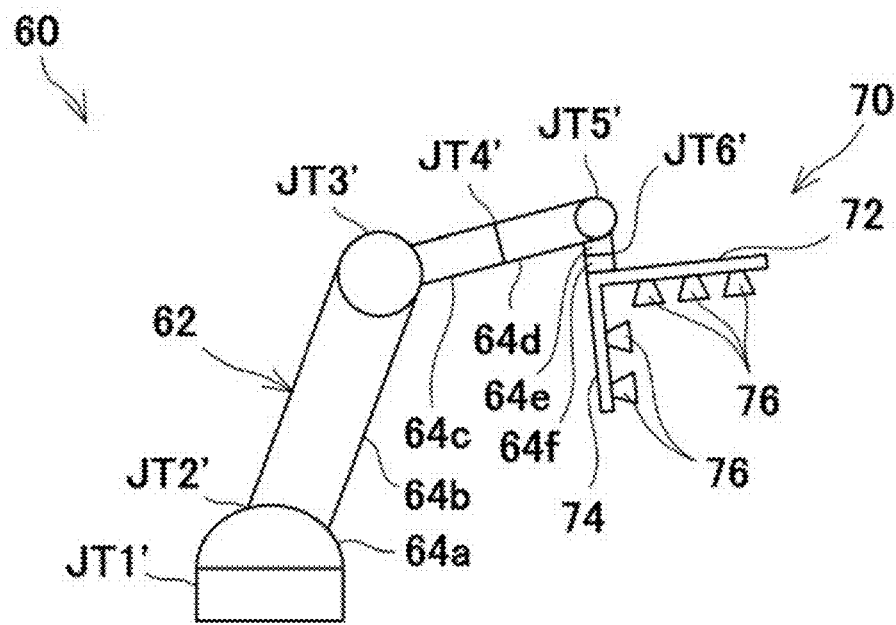
FIGS. 4A and 4B are views illustrating a second robot of the robot system according to an exemplary embodiment of the present disclosure, where
Figure 4B:
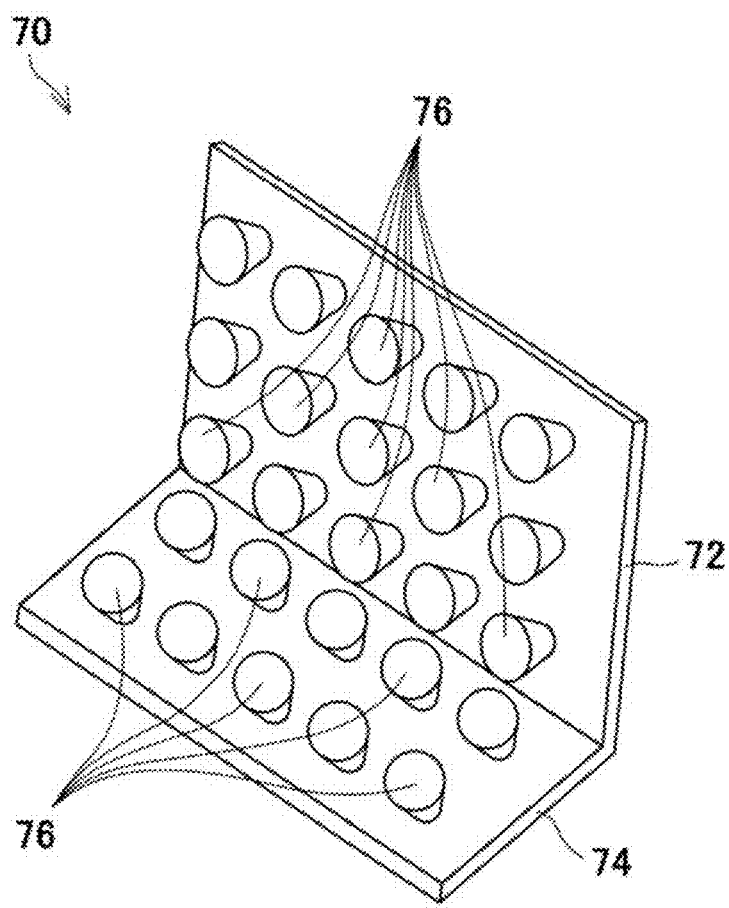

FIGS. 4A and 4B are views illustrating the second robot of the robot system according to this embodiment. FIG. 4A is an overall side view, and FIG. 4B is a perspective view of a second robot hand when seen from the inside. As illustrated in FIG. 4A, the second robot 60 is provided with a second robotic arm 62 and a second robot hand 70 attached to a tip end of the second robotic arm 62. Moreover, as illustrated in FIG. 2, the second robot 60 is further provided with a second robot controller 89 which controls operations of the second robotic arm 62 and the second robot hand 70. The second robot 60 is a vertically articulated robot.

(Second Robotic Arm 62)

As illustrated in FIG. 4A, the second robotic arm 62 is an articulated arm having six joint axes (shafts) JT1'-JT6', and six links 64a-64f serially coupled to each other via the corresponding joint axes.

The first joint axis JT1' couples an upper surface of a tip-end part of the movable-part body 25 to a base-end part of the first link 64a so as to be rotatable about a vertical axis. The second joint axis JT2' couples a tip-end part of the first link 64a to a base-end part of the second link 64b so as to be rotatable about a horizontal axis. The third joint axis JT3' couples a tip-end part of the second link 64b to a base-end part of the third link 64c so as to be rotatable about a horizontal axis.

The fourth joint axis JT4' couples a tip-end part of the third link 64c to a base-end part of the fourth link 64d so as to be rotatable about an axis extending in a longitudinal direction of the third link 64c. The fifth joint axis JT5' couples a tip-end part of the fourth link 64d to a base-end part of the fifth link 64e so as to be rotatable about an axis extending perpendicularly to a longitudinal direction of the fourth link 64d. The sixth joint axis JT6' couples a tip-end part of the fifth link 64e to a base-end part of the sixth link 64f so as to be rotatable in a twisted manner. Then, the second robot hand 70 is attached to a tip-end part of the sixth link 64f.

(Second Robot Hand 70)

As illustrated in FIG. 4B, the second robot hand 70 has a first plate-like member 72 in a rectangular shape when seen in its thickness direction, a second plate-like member 74 in a rectangular shape when seen in its thickness direction, and suction parts 76 provided to inner surfaces of the first plate-like member 72 and the second plate-like member 74.

The first plate-like member 72 is attached, at an intermediate part in a longitudinal dimension of its base-end part on an outer surface, to the tip-end part of the sixth link 64f. The second plate-like member 74 has the same longitudinal dimension as the first plate-like member 72. Then, an end edge of the first plate-like member 72 in its width direction, which extends in the longitudinal direction, is connected to an end edge of the second plate-like member 74 in its width direction, which extends in the longitudinal direction. Therefore, the second robot hand 70 has an L-shaped structure in the side view as illustrated in FIG. 4A.

The first plate-like member 72 is provided on its inner surface with a total of fifteen (15) suction parts 76 aligned in parallel so as to be three rows in the width direction and five columns in the longitudinal direction (i.e., 3×5 in row and column). Moreover, the second plate-like member 74 is provided on its inner surface with a total of ten (10) suction parts 76 aligned in parallel so as to be two rows in the width direction and five columns in the longitudinal direction (i.e., 2×5 in row and column). That is, the second robot hand 70 has the total of twenty-five (25) suction parts 76.

Each of the 25 suction parts 76 is formed to be a hollow tapered shape, and the tapered tip end is attached to the first plate-like member 72 or the second plate-like member 74. The suction parts 76 are each connected to a vacuum generator, and thus, the pressure inside the suction part 76 becomes negative. The 25 suction parts 76 suck an upper surface and a side surface of the cardboard box W by the negative pressure so as to cooperatively hold one cardboard box W.

(Second Robot Controller 89)

As illustrated in FIG. 2, the second robot controller 89 controls the operations of the second robotic arm 62 and the suction parts 76 (a holding part) according to, for example, the operational information from the user interface 110 based on a program stored in advance in a storage device. A concrete configuration of the second robot controller 89 is not particularly limited, and, similarly to the first robot controller 59, it may be implemented, for example, by a known processor (e.g., a CPU) operating based on the program stored in the storage device (e.g., a memory).

(User Interface 110)

As illustrated in FIG. 1, the user interface 110 is disposed to be separated from the robot 12 by a given distance so as to remotely operate the robot 12 based on a command value manually inputted by an operator P.

A concrete configuration of the user interface 110 is not particularly limited, and it may accept a displacement of a control handle or pressing of a button as the command value, or the user interface 110 may be configured as a touch-panel screen which accepts pressing or touching of a screen display as the command value. Alternatively, the user interface 110 may accept voice as the command value, or may have other configurations.

The user interface 110 generates the operational information by accepting the command value manually inputted by the operator P, and transmits the operational information to the first robot controller 59, the second robot controller 89, and the movable-part controller 29.

(Imaging Device 112)

The imaging device 112 is provided in order to image the working state of the robot 12 so as to acquire video information. A configuration of the imaging device 112 is not particularly limited, and it may be configured as a known video camera.

(Output Device 114)

The output device 114 is a displaying device which outputs the video information captured by the imaging device 112. A concrete configuration of the output device 114 is not particularly limited, and it may be a Liquid Crystal Display, an Organic Electro-Luminescence Display, or other devices.

Example of Transferring

One example of the transferring executed by the robot system 10 according to this embodiment is described with reference to FIGS. 5 to 7. In this example, as described above, the robot system 10 is used to transfer the cardboard boxes W piled on the truck bed L one by one, to the stationary-type conveyor C disposed separately from the truck bed L.

Note that, in the following example of the transferring, the operator P may input the command value to the user interface 110 while grasping the working state of the robot 12 based on the video information outputted from the output device 114. Here, the video information outputted from the output device 114 is images of the working state of the robot 12 captured by the imaging device 112.

Figure 5A:
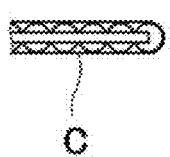
FIGS. 5A and 5B are side views illustrating the state in which the robot system according to an exemplary embodiment of the present disclosure is used to transfer the cardboard box, where
Figure 5A:
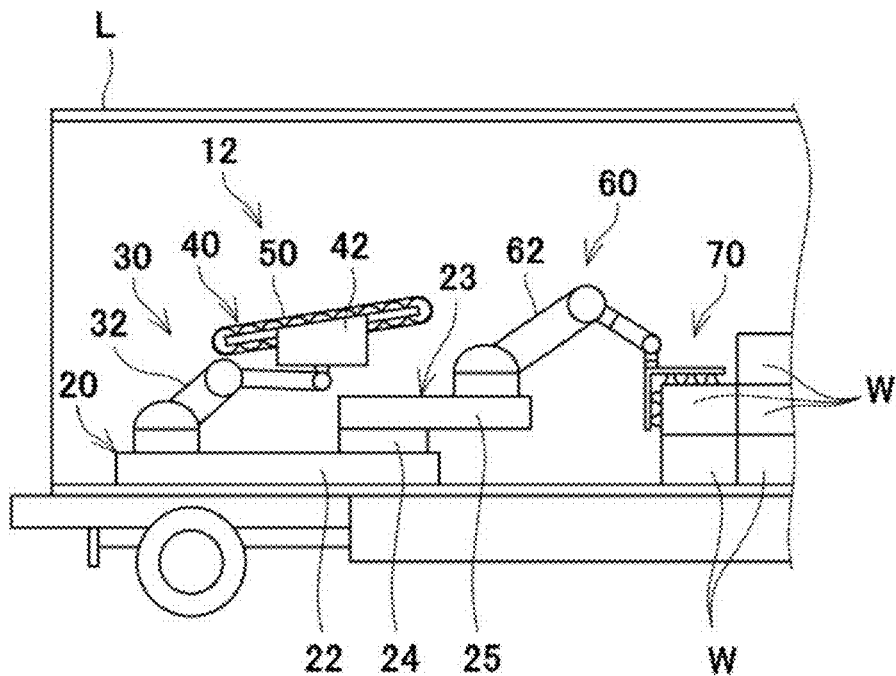
Figure 5B:
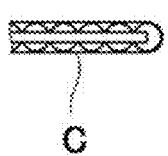
Figure 5B:
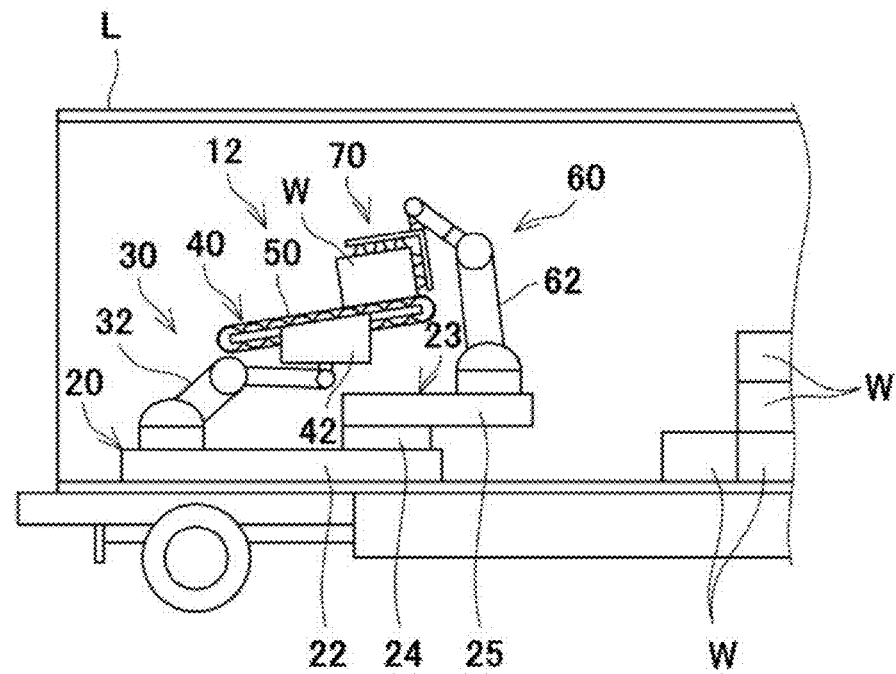
Figure 6A:
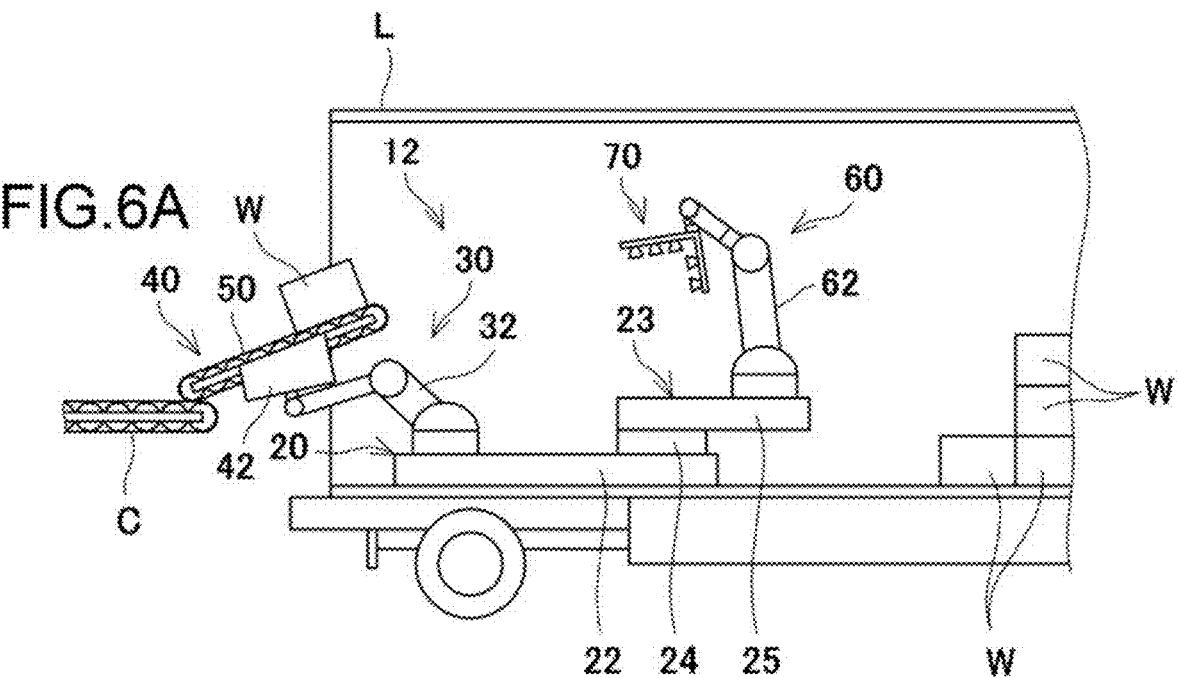
FIGS. 6A and 6B are side views illustrating the state in which the robot system according to an exemplary embodiment of the present disclosure is used to transfer the cardboard box, where
Figure 6B:
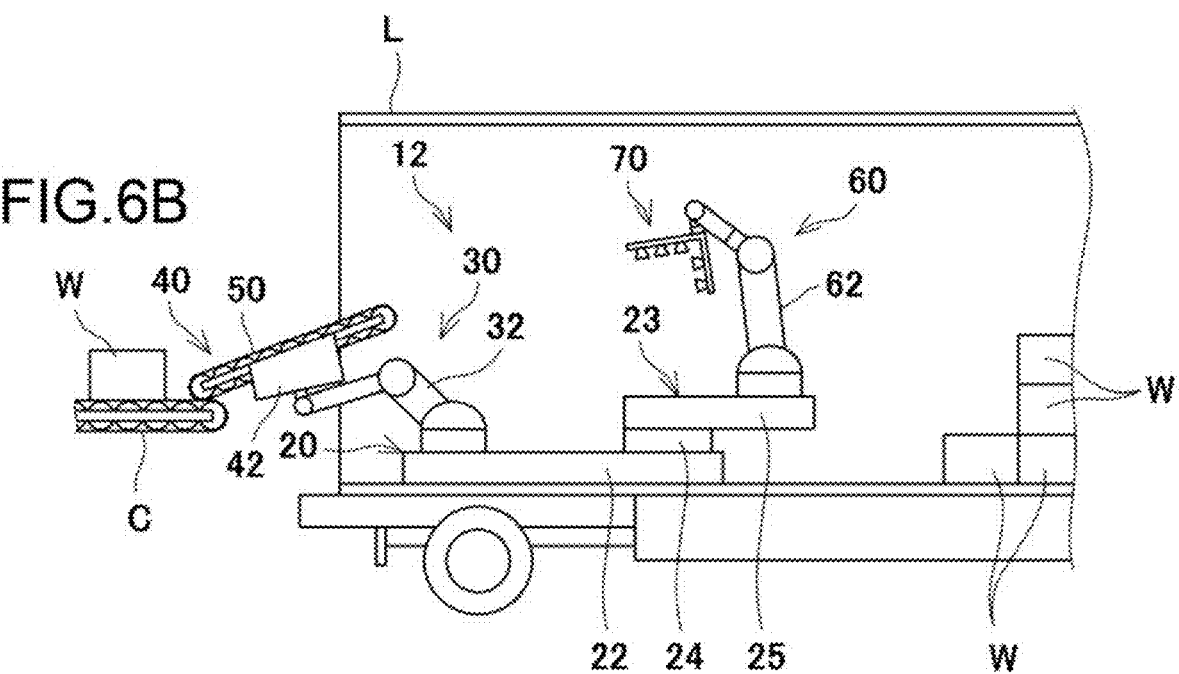

FIGS. 5A and 5B are side views illustrating the state in which the robot system according to this embodiment is used to transfer the cardboard box. FIG. 5A is a view when one of the piled cardboard boxes is held, and FIG. 5B is a view when the cardboard box is released on the transferring surface of the conveyor. FIGS. 6A and 6B are side views illustrating the state in which the robot system is used to transfer the cardboard box. FIG. 6A is a view when the posture of the first robot is changed so that the transferring surface of the conveyor continues to the transferring surface of the stationary-type conveyor, and FIG. 6B is a view when the transferring of the cardboard box to the stationary-type conveyor is finished. FIG. 7 is a view illustrating a driving state of the movable part of the robot system according to this embodiment when seen from above, where a part of the truck bed is cut to be omitted.

First, the operator P operates the user interface 110 to stop the transferring belt 56 of the conveyor 50. Moreover, the operator P operates the user interface 110 to change the posture of the first robotic arm 32 so that the upstream end of the transferring surface 58 of the conveyor 50 is located within the movable range of the tip end of the second robotic arm 62.

Next, the operator P operates the user interface 110 to change the posture of the second robotic arm 62 so that the 15 suction parts 76 provided to the inner surface of the first plate-like member 72 of the second robot hand 70 contact an upper surface of one cardboard box W located at the top of the cardboard boxes W (hereinafter, simply referred to as a "top cardboard box W"), and the 10 suction parts 76 provided to the inner surface of the second plate-like member 74 of the second robot hand 70 contact a side surface of the top cardboard box W.

Moreover, the operator P operates the user interface 110 to drive the vacuum generator to make inside the suction parts 76 negative pressure. Therefore, the suction parts 76 provided to the inner surface of the first plate-like member 72 suck the upper surface of the top cardboard box W, and the suction parts 76 provided to the inner surface of the second plate-like member 74 suck the side surface of the top cardboard box W, so as to hold the top cardboard box W. This state is illustrated in FIG. 5A.

Moreover, the operator P operates the user interface 110 to change the posture of the second robotic arm 62 so that a bottom surface of the cardboard box W sucked and held by the suction parts 76 of the second robot hand 70 contacts an upstream part of the transferring surface 58 of the conveyor 50 of the first robot hand 40.

Then, the operator P operates the user interface 110 to stop the vacuum generator so as to release the cardboard box W from the state sucked by the suction parts 76. In this manner, the second robot 60 places the cardboard box W held by the suction parts 76 (the holding part) on the transferring surface 58 of the conveyor 50 of the first robot 30, and releases it. This state is illustrated in FIG. 5B.

Next, the operator P operates the user interface 110 to change the posture of the first robotic arm 32 so that the transferring surface 58 of the conveyor 50 continues to upstream of the transferring surface of the stationary-type conveyor C. This state is illustrated in FIG. 6A.

Finally, the operator P operates the user interface 110 to drive the transferring belt 56 of the conveyor 50. Therefore, the cardboard box W placed on the transferring surface 58 of the conveyor 50 is moved downstream on the transferring surface 58, and is transferred from a downstream end of the transferring surface 58 to the upstream-end part of the transferring surface of the stationary-type conveyor C.

By repeating this transferring, the robot system 10 can transfer all of the cardboard boxes W piled on the truck bed L to the stationary-type conveyor C disposed separately from the truck bed L. Note that the stationary-type conveyor C may be a belt conveyor similarly to the conveyor 50. The belt conveyor may have a known structure. When the stationary-type conveyor C receives the cardboard box W from the conveyor 50 at its upstream part, it further transfers the cardboard box W to a desired destination.

Figure 7:
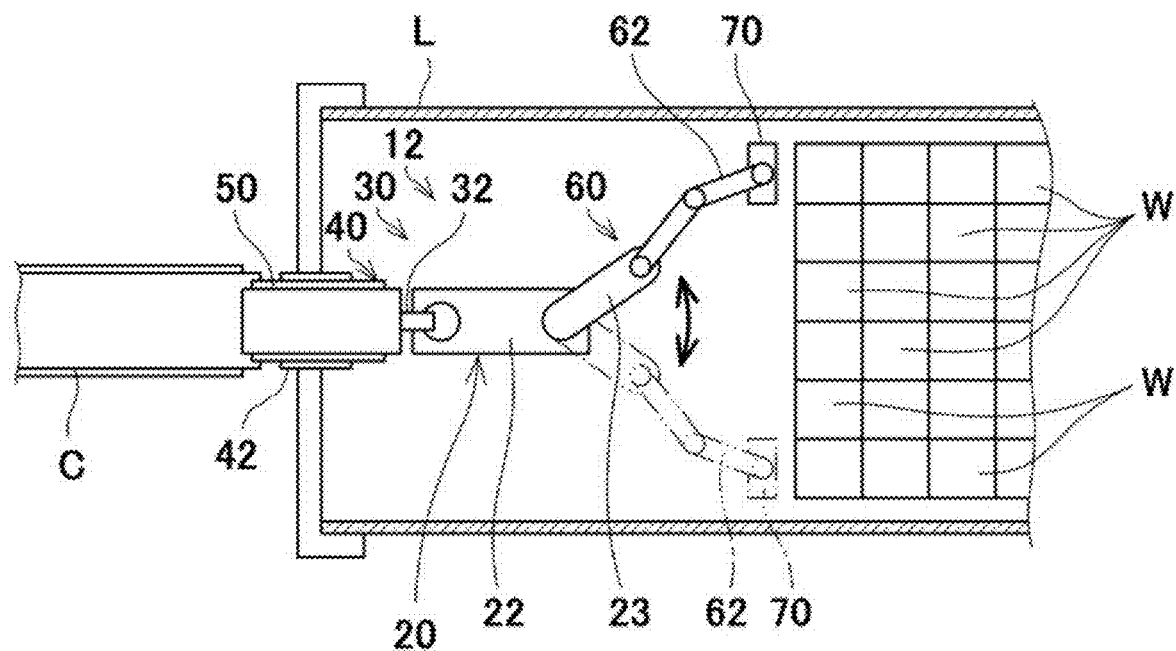
FIG. 7 is a view illustrating a driving state of a movable part of the robot system according to an exemplary embodiment of the present disclosure when seen from above, where a part of a truck bed is cut to be omitted.

Note that, as illustrated in FIG. 7, the operator P can operate the user interface 110 to drive the movable part 23 (in detail, rotate the pivot shaft 24 of the movable part 23) so that the second robot 60 fixed to the movable-part body 25 at its base-end part rotates centering on the pivot shaft 24, in the plane in which the longitudinal direction of the robot 12 intersects with the width direction.

Effects

According to the robot 12 of this embodiment, since the conveyor 50 is attached to the tip end of the first robotic arm 32, the conveyor 50 can be moved within the movable range of the tip end of the first robotic arm 32. Moreover, the second robot 60 can place the cardboard box W (the workpiece) sucked and held by the suction parts 76 (the holding part) onto the transferring surface 58 of the conveyor 50, and release it. As a result, the robot 12 capable of transferring the cardboard box W by the movable conveyor 50 while the installing location will not be limited, can be provided.

According to the robot 12 of this embodiment, the second robot 60 is movable in the width and longitudinal directions of the robot 12 by the movable part 23 provided to the base body 22. Therefore, even when the cardboard box W to be transferred is located outside the movable range of the tip end of the second robotic arm 62, the posture of the second robotic arm 62 can be easily changed so that the suction parts 76 can hold the cardboard box W. As a result, the effects achieved by the present disclosure can be remarkable.

In this embodiment, the movable part 23 has the pivot shaft 24 and the movable-part body 25 attached to the pivot shaft 24. The second robot 60 is fixed to the movable-part body 25 at its base end so as to be rotatable centering on the pivot shaft 24 in the plane in which the longitudinal direction of the robot 12 intersects with the width direction. Therefore, the second robot 60 is movable in the width and longitudinal directions. Accordingly, the second robot 60 can be moved in the width direction and the longitudinal direction by the movable part 23 having the simple configuration.

In this embodiment, the holding part is configured as the suction parts 76 which suck and hold the cardboard box W (the workpiece). Therefore, for example, even when holding one cardboard box W from the cardboard boxes W piled up without gaps therebetween, a side part etc. of the one cardboard box W can be sucked so that the one cardboard box W is easily held without interference of the other cardboard boxes W.

Since the robot system 10 according to this embodiment has the robot 12 as described above, effects similar to the robot 12 can be achieved.

Since the first robot 30 and the second robot 60 according to this embodiment are each configured as a vertically articulated robot, each of the first robotic arm 32 and the second robotic arm 62 can easily take a desired posture. As a result, the effects achieved by the present disclosure can be remarkable.

Since the first robotic arm 32 according to this embodiment has the four joint axes JT1-JT4, it can easily take a desired posture. Therefore, the first robot hand 40 and the conveyor 50 can be easily moved to desired positions. As a result, the effects achieved by the present disclosure can be remarkable.

Since the second robotic arm 62 according to this embodiment has the six joint axes JT1'-JT6', it can easily take a desired posture. Therefore, the second robot hand 70 and the suction parts 76 can be easily moved to desired positions.

In this embodiment, the robot 12 can be remotely operated by using the user interface 110. As a result, the cardboard box W can be transferred by the movable conveyor 50 while the installing location will further be unlimited.

In this embodiment, the operator P can input the command value to the user interface 110 while accurately grasping the working state of the robot 12 based on the video information outputted from the output device 114.

(Modifications)

It is apparent for a person skilled in the art that many improvements and other embodiments of the present disclosure are possible from the above description. Therefore, the above description is to be interpreted only as illustration, and it is provided in order to teach a person skilled in the art the best mode for implementing the present disclosure. The details of the structures and/or the functions may be substantially changed, without departing from the spirit of the present disclosure.

(First Modification)

First Modification of the robot system according to an exemplary embodiment is described with reference to FIG. 8. Note that a configuration of a robot system according to this modification is the same as that of the robot system 10 described above, except for the configuration of the base 20. Therefore, the same reference characters are given to the same components to omit redundant description.

Figure 8:
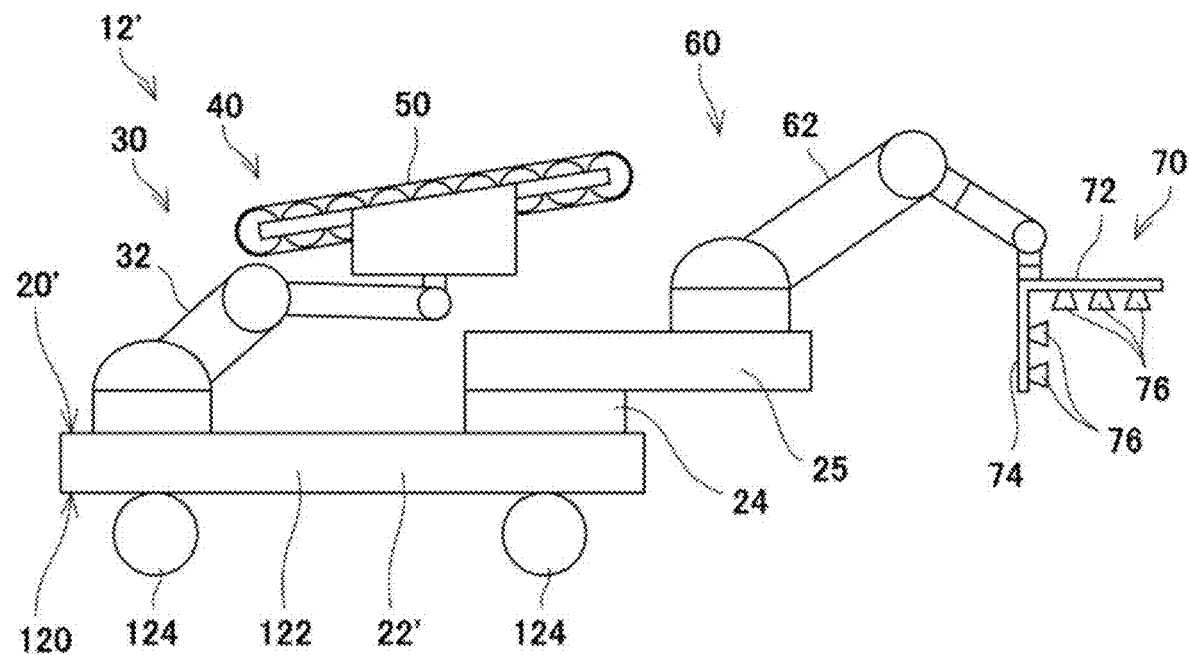
FIG. 8 is a side view illustrating the robot system according to an exemplary embodiment of the present disclosure.

FIG. 8 is a side view illustrating a robot of First Modification of the robot system according to this embodiment. As illustrated in FIG. 8, a base 20' of a robot 12' of this modification has an AGV (Automated Guided Vehicle) 120.

The AGV 120 has a vehicle body 122 formed in a plate-like shape, wheels 124 attached to a bottom surface of the vehicle body 122, and an AGV controller which controls operation of the AGV 120.

The base end of the first robot 30 is fixed to an upper surface of the vehicle body 122 formed in the plate-like shape, and the base end of the pivot shaft 24 of the movable part 23 is pivotally supported on the upper surface of the vehicle body 122. That is, in this modification, the vehicle body 122 constitutes the base body 22 in the embodiment described above.

The AGV controller controls the operation of the AGV 120 according to, for example, the operational information from the user interface 110, based on a program stored in advance in a storage device. A concrete configuration of the AGV controller is not particularly limited, and it may be implemented, for example, by a known processor (e.g., a CPU) operating based on the program stored in the storage device (e.g., a memory).

Note that the AGV controller may detect weak induced current from electric wiring buried underground of a work site, and control the operation of the AGV 120 based on the detected value. In this case, the operational information may be received from the user interface 110 as needed. The functionality of the elements disclosed herein including but not limited to the first robot controller 59, the second robot controller 89, the moveable-part controller 29, and the AGV controller may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

According to this modification, since the robot 12 can be easily moved, the effects achieved by the present disclosure can be remarkable. For example, according to the embodiment described above, as illustrated in FIG. 7, the second robot 60 can hold the cardboard box W placed at the end of the truck bed L in the width direction, which is outside the movable range of the tip end of the second robotic arm 62. In addition to this, since the second robot 60 can be moved by the AGV 120, it can hold the cardboard box W placed at the end of the truck bed L in the longitudinal direction, which is outside the movable range of the tip end of the second robotic arm 62.

(Second Modification)

Second Modification of the robot system according to the embodiment is described with reference to FIG. 9. Note that a configuration of a robot system according to this modification is the same as that of the robot system 10 described above, except for a configuration of a first robotic arm 32". Therefore, the same reference characters are given to the same components to omit redundant description.

Figure 9:
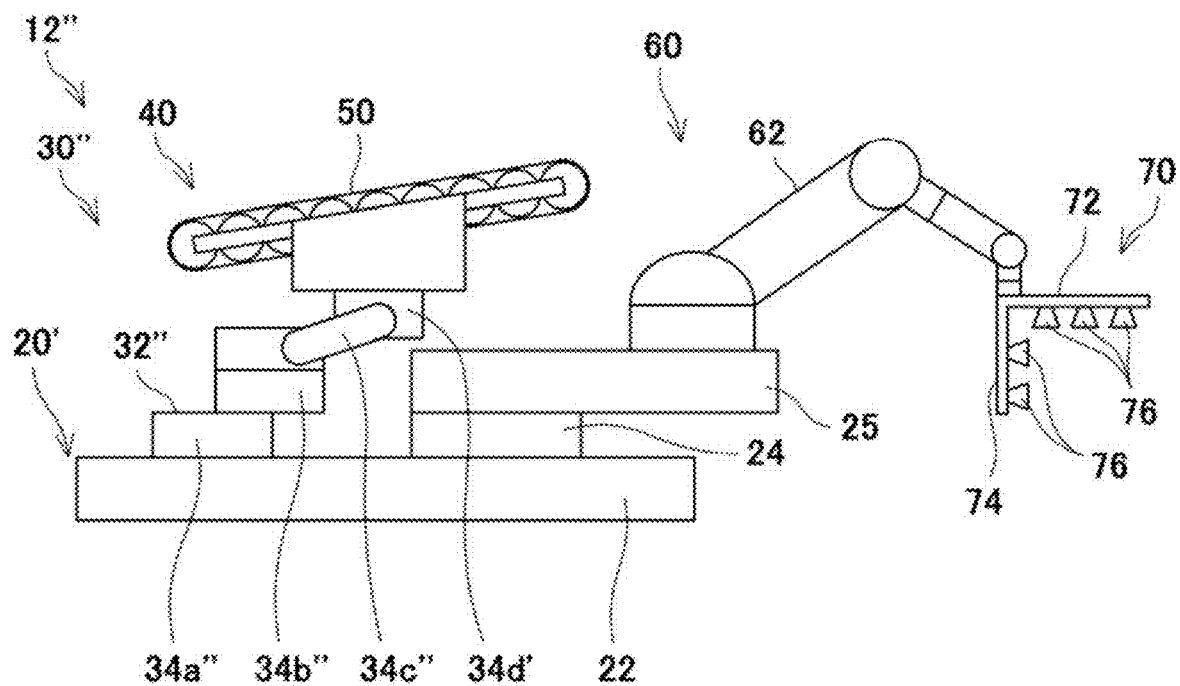
FIG. 9 is a side view illustrating the robot system according to an exemplary embodiment of the present disclosure.

FIG. 9 is a side view illustrating a robot of Second Modification of the robot system according to an exemplary embodiment. As illustrated in FIG. 9, the first robotic arm 32" of a robot 12" of this modification has a first link 34a" coupled to the upper surface of the base body 22 at its base end so as to be rotatable about a vertical axis, and a second link 34b" coupled to a tip end of the first link 34a" at its base end so as to be slidable in the longitudinal direction of the robot 12.

Moreover, the first robotic arm 32" has a pair of third links 34c" coupled at their base ends to a tip end of the second link 34b" at both ends in the width direction so as to be rotatable about a horizontal axis. The first robotic arm 32" also has a fourth link 34d" coupled to tip ends of the pair of third links 34c" at its base end so as to be rotatable about a horizontal axis, and coupled to the base part 42 of the first robot hand 40.

The first robotic arm 32" may not be twistable by being configured as described above. Accordingly, the structure of the first robotic arm 32" can be simplified.

(Other Modifications)

Although in the embodiment described above the cardboard box W to be transferred is placed on the truck bed L, and the robot 12 is disposed on the truck bed L, it is not limited to this. For example, the cardboard box W to be transferred may be placed on the ground and the robot 12 may be disposed on the ground near the cardboard box W. Alternatively, the cardboard box W may be placed at another place, and the robot 12 may be disposed near the cardboard box W to transfer it.

Although in an exemplary embodiment the transferred workpiece is the cardboard box W, it is not limited to this. The workpiece may be another object having a given shape (e.g., a member used for assembling machinery, and packed food), or an object not having a fixed shape, such as a rock and a fried chicken.

In the embodiment described above, the transferring belt 56 of the conveyor 50 is started to drive after the cardboard box W is placed on the transferring surface 58 of the conveyor 50, the posture of the first robotic arm 32 is changed so that the transferring surface 58 of the conveyor 50 continues to upstream of the transferring surface of the stationary-type conveyor C, and the cardboard box W is released from being held by the suction parts 76. However, it is not limited to this, and the transferring may be performed while the transferring belt 56 of the conveyor 50 is always driven. Accordingly, the cardboard boxes W can be transferred one by one in a shorter period of time.

In the embodiment described above, as illustrated in the block diagram of FIG. 2, the robot system 10 is provided with the robot 12, the user interface 110, the imaging device 112, and the output device 114. However, it is not limited to this, and the robot system 10 may further include other configurations. For example, the robot system 10 may further include the stationary-type conveyor C, which is the transferring destination of the cardboard box W in the embodiment described above. In this case, for example, the operator P may operate the user interface 110 to control the operation of the stationary-type conveyor C.

Although in an exemplary embodiment the position of the conveyor 50 is changed only by changing the posture of the first robotic arm 32 (and moving the AGV 120), it is not limited to this. For example, the conveyor 50 may be attached to the base part 42 so as to be rotatable with respect to the base part 42 in a plane in which the transferring direction intersects with the height direction of the conveyor 50. Alternatively, the base part 42 may be provided with a pair of rails, and the conveyor 50 may be attached to the base part 42 so as to be movable along the rails. Note that in this case the first robot controller 59 may further control the operation of the base part 42.

Although in an exemplary embodiment the holding part is comprised of the 25 suction parts 76 which suck and hold the cardboard box W (the workpiece), it is not limited to this. For example, the number of the suction parts 76 may be one or more and twenty-four or less, or twenty-six or more.

Moreover, the shape of each of the 25 suction parts 76 is not limited to the hollow tapered shape, but may be a hollow rectangular parallelepiped shape or a hollow cylindrical shape, or other shapes. Furthermore, the holding part may be a gripping part which grips the workpiece to hold it, a placing part which places the workpiece thereon to hold it, or other configurations.

Although in an exemplary embodiment the conveyor 50 is the belt conveyor, it is not limited to this. For example, the conveyor 50 may be a roller conveyor, or other types of conveyor.

Although in an exemplary embodiment the movable part 23 has the pivot shaft 24 and the movable-part body 25 attached to the pivot shaft 24, it is not limited to this. For example, the pivot shaft 24 may be expandable and contractible in the height direction so that the movable-part body 25 and the second robot 60 fixed to the movable-part body 25 are movable in the height direction.

Moreover, for example, the movable part 23 may have a structure including a pair of rails extending in the width direction of the robot 12, and a movable element which moves on the pair of rails. In this case, the second robot 60 may be movable in the width direction of the robot 12 by the base end of the second robot 60 being fixed to the movable element.

Similarly, the movable part 23 may have a pair of rails extending in the longitudinal direction of the robot 12, and the movable element. Accordingly, the second robot 60 is movable in the longitudinal direction of the robot 12. Note that the movable part 23 may be provided with both of the rails extending in the width direction and the rails extending in the longitudinal direction. For example, by the movable part described above being provided as needed, the second robot 60 may be movable at least in one of the width direction and the longitudinal direction. Note that the robot 12 may not be provided with the movable part 23. In this case, the base end of the second robot 60 is fixed to the base body 22. Therefore, the structure of the robot 12 can be further simplified.

Although in an exemplary embodiment the base body 22 is formed in the plate-like shape, it is not limited to this. The base body 22 may have another shape, such as rectangular parallelepiped shape and a cylindrical shape, as long as the base end of the first robot 30 and the base end of the second robot 60 can be fixed thereto.

Although in an exemplary embodiment the first robot 30 changes the posture of the first robotic arm 32 after receiving the cardboard box W from the second robot 60 so that the transferring surface 58 of the conveyor 50 continues to upstream of the transferring surface of the stationary-type conveyor C, it is not limited to this. For example, the conveyor 50 may perform the transferring while the posture of the first robotic arm 32 is fixed, as long as the upstream end of the transferring surface 58 can be located within the movable range of the tip end of the second robotic arm 62, and the downstream end of the transferring surface 58 can be positioned to continue upstream of the transferring surface of the stationary-type conveyor C. Accordingly, the workpiece can be easily and promptly transferred by using the robot system 10.

Although in an exemplary embodiment the first robot 30 and the second robot 60 are each configured as a vertically articulated robot, it is not limited to this. For example, each of the first robot 30 and the second robot 60 may be a polar robot, a cylindrical robot, a Cartesian coordinate robot, a horizontally articulated robot, or other types of robot. The types of the first robot 30 and the second robot 60 may be different from each other.

Although in an exemplary embodiment the first robotic arm 32 has the four joint axes, it is not limited to this. For example, the first robotic arm 32 may have five or more joint axes. Alternatively, the first robotic arm 32 may have one or more and three or less joint axes.

Although in an exemplary embodiment the second robotic arm 62 has the six joint axes, it is not limited to this. For example, the second robotic arm 62 may have seven or more joint axes. Alternatively, the second robotic arm 62 may have one or more and five or less joint axes.

Although in an exemplary embodiment the robot system 10 is provided with the imaging device 112 and the output device 114, it is not limited to this. For example, the robot system 10 may not be provided with the imaging device 112 and the output device 114, but the operator P may visually confirm the working state of the robot 12. Accordingly, the configuration of the robot system 10 can be further simplified.

Although in an exemplary embodiment the robot system 10 allows the operator P to input the command value using the user interface 110 so as to operate the robot 12 based on the command value, it is not limited to this. For example, the robot system 10 may be a fully automatic system without the user interface 110.

In order to implement the robot system 10 as the fully automatic system, the first robotic arm 32 may be provided with a proximity sensor at its tip end, and the first robot controller 59 may control the operations of the first robotic arm 32 and the first robot hand 40 based on a detection value of the proximity sensor, etc. Alternatively, the first robotic arm 32 may be provided with a camera at its tip end, and the first robot controller 59 may control the operations of the first robotic arm 32 and the first robot hand 40 based on an analytical value of the imaged information of the camera, etc. Note that since this configuration is similarly applied to the second robotic arm 62, description is not repeated.

According to the present disclosure, a robot and a robot system having it, capable of transferring a workpiece by a movable conveyor while the installing location will not be limited, can be provided.

DESCRIPTION OF REFERENCE CHARACTERS

10 Robot System
12 Robot
20 Base
22 Base Body
23 Movable Part
24 Pivot Shaft
25 Movable-part Body
29 Movable-part Controller
30 First Robot
32 First Robotic Arm
34 Link
40 First Robot Hand
42 Base Part
44 Bottom Plate
46 Side Plate
50 Conveyor
52 Roller
54 Shaft
56 Transferring Belt
58 Transferring Surface
59 First Robot Controller 60 Second Robot
62 Second Robotic Arm
64 Link
70 Second Robot Hand
72 First Plate-like Member
74 Second Plate-like Member
76 Suction Part
89 Second Robot Controller
110 User Interface
112 Imaging Device
114 Output Device
120 AGV
122 Vehicle Body
124 Wheel
JT Joint Axis
C Stationary-type Conveyor
L Truck Bed
P Operator
W Cardboard Box

What is claimed is:

1. A robot, comprising:
   a base;
   a first robot fixed to the base at a base end thereof; and
   a second robot fixed to the base at a base end thereof,
   wherein the first robot has a first robotic arm and a first robot hand attached to a tip end of the first robotic arm,
   wherein the second robot has a second robotic arm and a second robot hand attached to a tip end of the second robotic arm,
   wherein the first robot hand includes a conveyor, and the second robot hand includes a holder to hold a workpiece, and
   wherein the second robot places the workpiece held by the holder on a transferring surface of the conveyor of the first robot and releases the workpiece.

2. The robot of claim 1, wherein the base has a base body and a movable structure included on the base body,
   wherein the first robot is fixed to the base body at the base end thereof, and
   wherein the second robot is fixed to the movable structure at the base end thereof so as to be movable at least in one of a longitudinal direction connecting the base end of the first robot and the base end of the second robot and a width direction perpendicular to the longitudinal direction.

3. The robot of claim 2, wherein the movable structure has:
   a pivot shaft extending from the base body; and
   a movable-structure body attached to the pivot shaft so as to be pivotable centering on the pivot shaft in a plane in which the longitudinal direction intersects with the width direction, and
   wherein the second robot is fixed to the movable-structure body at the base end thereof so as to be movable at least in one of the longitudinal direction and the width direction.

4. The robot of claim 1, wherein the base includes an automated guided vehicle.

5. The robot of claim 1, wherein the holder is a suctioner to suck and hold the workpiece.

6. The robot of claim 1, wherein the conveyor is a belt conveyor.

7. The robot of claim 1, wherein at least one of the first robot and the second robot is a vertically articulated robot.

8. The robot of claim 1, wherein the first robotic arm has four or more joint axes.

9. The robot of claim 1, wherein the second robotic arm has six or more joint axes.

10. A robot system comprising the robot of claim 1.

11. The robot system of claim 10, further comprising a user interface configured to remotely operate the robot.

12. The robot system of claim 10, further comprising:
    an imager configured to image a working state of the robot; and
    an outputter configured to output the imaged information of the imager.

13. A robot, comprising:
    a base;
    a first robot fixed to the base at a base end thereof; and
    a second robot fixed to the base at a base end thereof,
    wherein the first robot has a first robotic arm and a first robot hand attached to a tip end of the first robotic arm,
    wherein the second robot has a second robotic arm and a second robot hand attached to a tip end of the second robotic arm,
    wherein the first robot hand includes a means for conveying, and the second robot hand includes a means for holding a workpiece, and
    wherein the second robot places the workpiece held by the means for holding on a transferring surface of the means for conveying of the first robot and releases the workpiece.

14. The robot of claim 13, wherein the base has a base body and a movable structure included on the base body,
    wherein the first robot is fixed to the base body at the base end thereof, and
    wherein the second robot is fixed to the movable structure at the base end thereof so as to be movable at least in one of a longitudinal direction connecting the base end of the first robot and the base end of the second robot and a width direction perpendicular to the longitudinal direction.

15. The robot of claim 14, wherein the movable structure has:
    a means for pivoting extending from the base body; and
    a movable-structure body attached to the means for pivoting so as to be pivotable centering on the means for pivoting in a plane in which the longitudinal direction intersects with the width direction, and
    wherein the second robot is fixed to the movable-structure body at the base end thereof so as to be movable at least in one of the longitudinal direction and the width direction.

16. The robot of claim 13, wherein the base includes an automated guided vehicle.

17. The robot of claim 13, wherein the means for holding is a means for suctioning and holding the workpiece.

18. The robot of claim 13, wherein the means for conveying is a belt conveyor.

19. The robot of claim 13, wherein at least one of the first robot and the second robot is a vertically articulated robot.

20. The robot of claim 13, wherein the first robotic arm has four or more joint axes.

* * * * *